United States Patent
Watanabe et al.

(10) Patent No.: US 7,603,227 B2
(45) Date of Patent: Oct. 13, 2009

(54) APPARATUS FOR AND METHOD OF CONTROLLING A VEHICLE

(75) Inventors: Satoru Watanabe, Isesaki (JP); Keiichi Takayanagi, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 437 days.

(21) Appl. No.: 11/526,641

(22) Filed: Sep. 26, 2006

(65) Prior Publication Data
US 2007/0073470 A1   Mar. 29, 2007

(30) Foreign Application Priority Data
Sep. 26, 2005   (JP) ............................. 2005-278557

(51) Int. Cl.
*G06F 19/00* (2006.01)
*G06G 7/70* (2006.01)
(52) U.S. Cl. ................................... 701/113; 123/179.1
(58) Field of Classification Search ................ 701/113, 701/29, 114, 102; 123/179.1
See application file for complete search history.

(56) References Cited

U.S. PATENT DOCUMENTS 6,281,598 B1 *   8/2001   King et al. .................. 701/29
6,945,035 B2 *   9/2005   Hirooka et al. ............... 60/274
2004/0099233 A1   5/2004   Fujimoto et al.

FOREIGN PATENT DOCUMENTS

JP   10-159626 A   *   6/1998
JP   2004-340028 A       12/2004

OTHER PUBLICATIONS

Chinese Office Action for Chinese Application No. 200610159926.0, mailed Jul. 4, 2008, 4 pgs.

* cited by examiner

*Primary Examiner*—Hieu T Vo
(74) *Attorney, Agent, or Firm*—Foley & Lardner LLP

(57) ABSTRACT

Predicting of starting of an engine is performed in advance before starting of the engine. When the starting of the engine is predicted, a failure diagnosis of a device such as a heater, a pump and so forth, which are attached to the engine and to be operated before starting of the engine, is made. When the heater and the pump are determined to be normal from the result of the diagnosis, the heater and the pump are operated before the engine is started. With this, the temperature of the heater can be increased and the pressure of a fluid carried by the pump can be increased before starting the starting of the engine.

15 Claims, 4 Drawing Sheets

APPARATUS FOR AND METHOD OF CONTROLLING A VEHICLE

BACKGROUND OF THE INVENTION

1. Field of the Invention

The present invention relates to an apparatus for and a method of controlling a vehicle and, in particular, to a control technology at the time of starting a vehicular engine.

2. Description of the Related Art

Japanese Unexamined Patent Publication No. 2004-340028 discloses a start preparation system that detects the opening/closing of a vehicle door, an insertion of a key into a key cylinder, a driver sitting down on the seat, and fastening of a seat belt, predicts the starting of the engine from the detection results and starts to prepare starting an engine when the starting of the engine is predicted.

For the preparation of starting of the engine, supply of electric current to a heater arranged in a fuel injection valve for injecting fuel into the engine is started.

However, when a device or devices are operated before starting the engine in order to prepare the starting of the engine, if even one of the devices is failed and is not operated normally, electric power is wastefully consumed. Moreover, when a short circuit occurs in the drive circuit of the device, a large amount of electric current must pass through the drive circuit. An excessive power consumption before starting the engine results in exhausting a battery.

SUMMARY OF THE INVENTION

Therefore, an object of the present invention is to avoid wasteful consumption of electric power from a vehicular battery by the operation of a failed device.

To achieve the above object, the present invention predicts the starting of an engine in advance, and as soon as the starting of the engine is predicted, diagnose of a device or devices is carried out.

The other objects, features and advantages of this invention will become understood from the following description with reference to the accompanying drawing.

DESCRIPTION OF THE PREFERRED EMBODIMENTS

Figure 1:
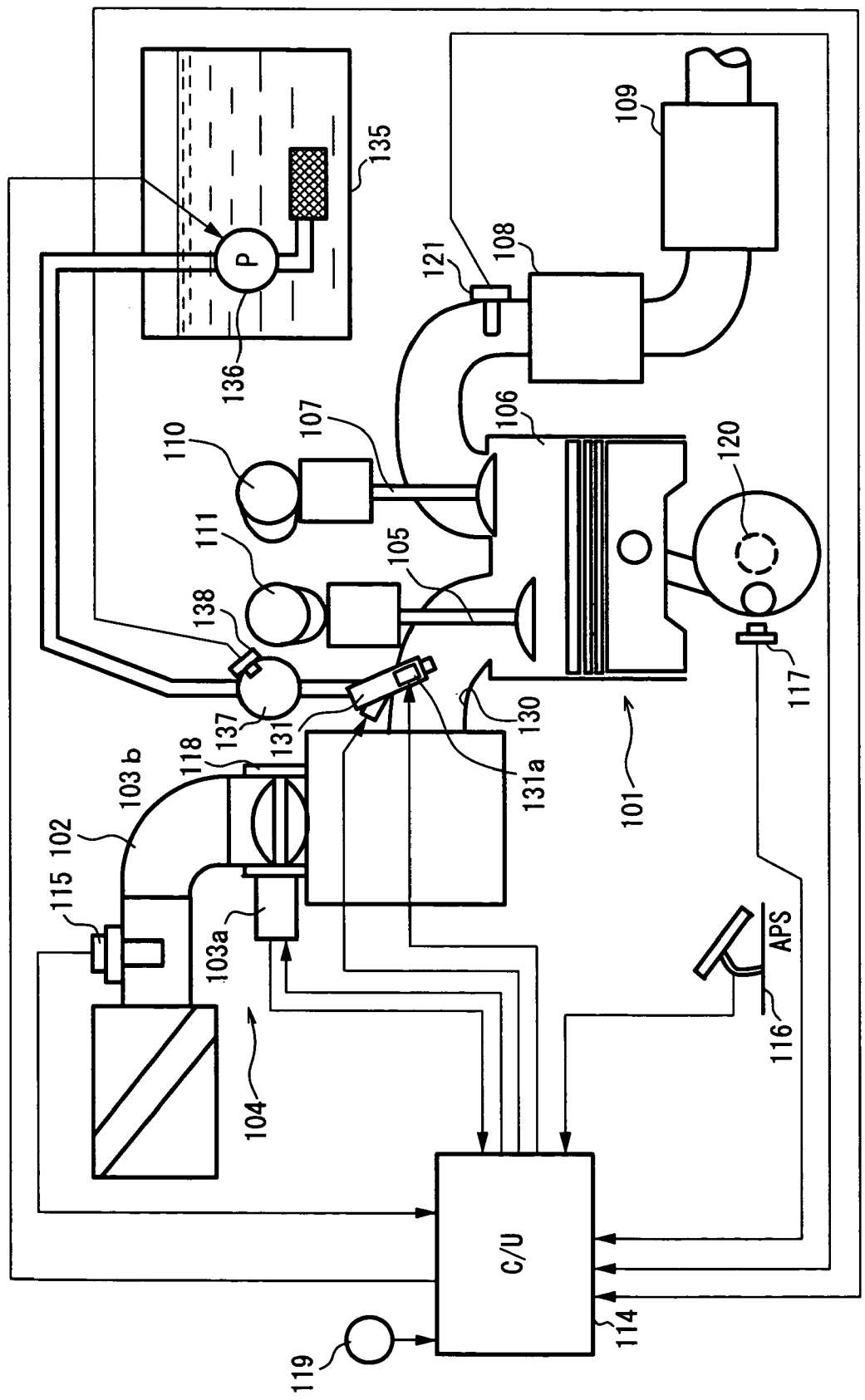
FIG. 1 is a diagrammatic view showing a general construction of an engine for a vehicle to which the present invention is applied.

FIG. 1 is a diagrammatic view showing an engine for a vehicle in an embodiment of the present invention.

In FIG. 1, an electronically controlled throttle 104 is arranged in an intake pipe 102 of an engine (gasoline engine) 101. Electronically controlled throttle 104 is a device for driving a throttle valve 103b by a throttle motor 103a.

Air is sucked into a combustion chamber 106 via electronically controlled throttle 104 and an intake valve 105.

A fuel injection valve 131 is arranged in an intake port 130 of each cylinder. Each fuel injection valve 131 has a heater 131a for heating fuel.

When fuel injection valve 131 is opened by an injection pulse signal from a control unit 114, fuel injection valve 131 injects fuel adjusted to a target pressure toward intake valve 105.

Fuel sucked into combustion chamber 106 is ignited and burned by spark ignition by an ignition plug (not shown in the drawing figure).

Combustion exhaust within combustion chamber 106 is discharged into an exhaust pipe via an exhaust valve 107 and is cleaned by a front catalyst 108 and a rear catalyst 109, and is then discharged into the atmosphere.

Intake valve 105 and exhaust valve 107 are driven by cams provided on camshafts 111, 110, respectively.

An electrically operated fuel pump 136 is incorporated in a fuel tank 135. Fuel is pressure-fed to fuel injection valve 131 by operating this fuel pump 136.

A fuel pressure sensor 138 is arranged in a distribution pipe 137 by which fuel having discharged from fuel pump 136 is distributed to respective fuel injection valves 131. The amount of discharge from fuel pump 136 is controlled in a feedback manner by control unit 114 so that a fuel pressure detected by fuel pressure sensor 138 is made equal to a target pressure.

The control unit 114 has a microcomputer incorporated therein and controls electronically controlled throttle 104, fuel injection valve 131, heater 131a, and fuel pump 136 by operation processing based on detected signals from various kinds of sensors.

Examples of the various kinds of sensors include; as well as fuel pressure sensor 138, an accelerator position sensor 116 for detecting an amount of depression of an accelerator pedal operated by a driver, an air flow meter 115 for detecting an intake air volume Q of engine 101, a crank angle sensor 117 for detecting a rotational position of a crankshaft 120, a throttle sensor 118 for detecting a degree of opening TVO of throttle valve 103b, a water temperature sensor 119 for detecting a cooling water temperature or coolant temperature of engine 101, a heater fitted air-fuel ratio sensor 121 for detecting an air-fuel ratio on the basis of an oxygen concentration in an exhaust gas on the upstream side of front catalyst 108.

Control unit 114 has the function of predicting the starting of the engine before the starting of the engine by the driver's operation by means of an ignition key or a start button, and the function of making a failure diagnosis of the various kinds of sensors and preparing the starting of the engine in cases where the starting of the engine is predicted. Hereinafter, an engine starting control will be described.

Figure 3:
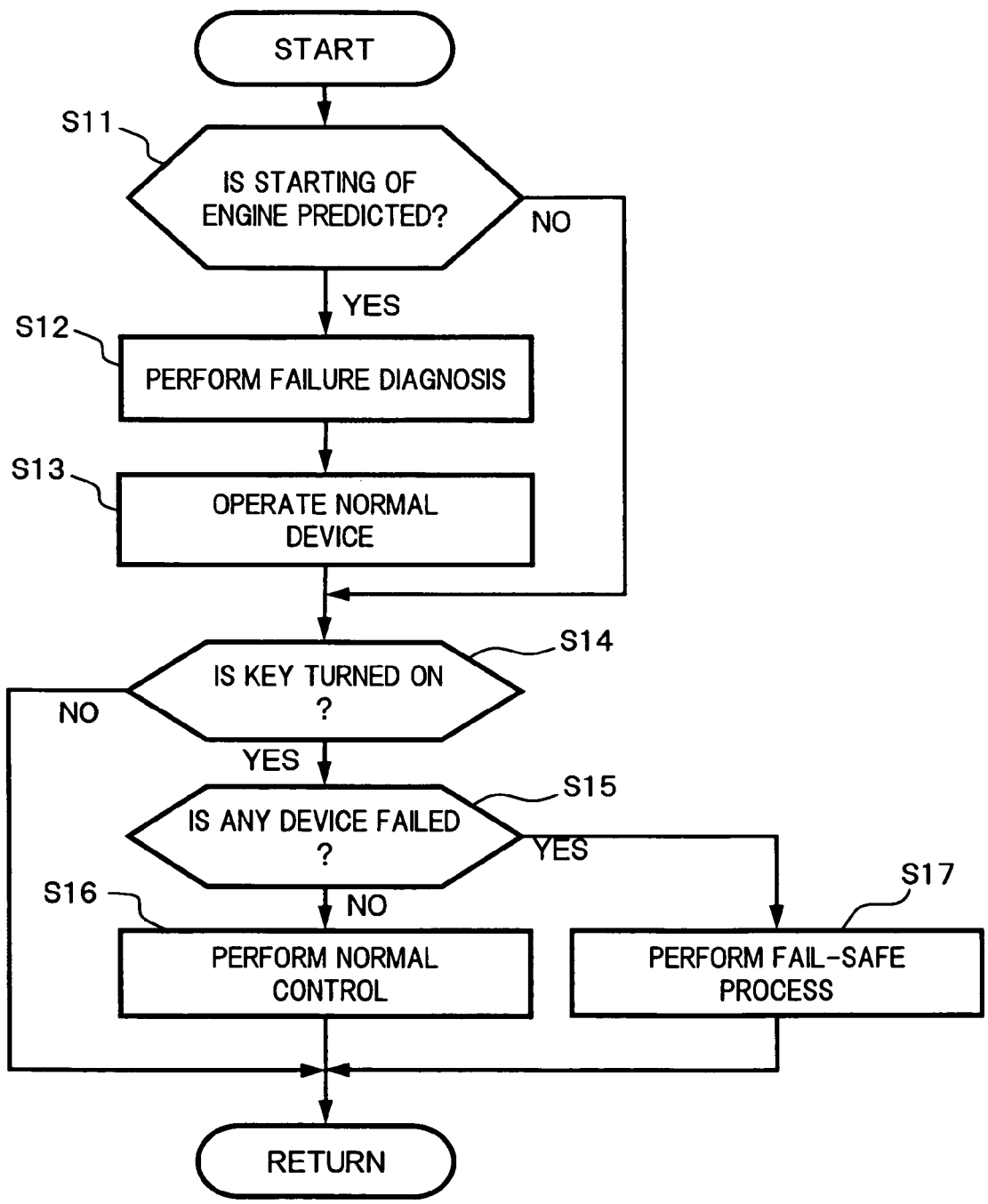
FIG. 3 is a flow chart illustrating starting control operation according to a first embodiment of the present invention.

A flow chart in FIG. 3 shows a first embodiment of an engine starting control.

In the flow chart in FIG. 3, first, in step S11, the starting of the engine is predicted in advance by detecting an occupant riding in a vehicle or having an intention to ride in a vehicle.

Detection of an occupant riding in a vehicle or having an intention to ride in a vehicle is performed on the basis of any one of the following (1) to (10) shown below:

(1) an opening or closing of a vehicle door;
(2) an unlocking of a door by a key or a remote controller;
(3) an inspection of an ID signal of a remote controller:
(4) an insertion of a key into an ignition key cylinder;
(5) an insertion of a key into a key hole of a door;
(6) a driver's sitting down on a seat;
(7) a fastening of a seat belt of a driver's seat;
(8) a releasing of an antitheft security system;
(9) a detection of a moving body around a vehicle; and
(10) a person authentication.

The person authentication is to identify whether or not a person riding in a vehicle or showing an intention to ride in a vehicle is a person or one of persons previously registered.

The person authentication is used for, for example, releasing an antitheft security system, automatically unlocking a door, automatic seat position, automatic change control of driving characteristics, and automatic confirmation of driving certification and driving history.

The person authentication is performed on the basis of biometrics by a fingerprint or the like, property authentication by such as a driver's license, and knowledge authentication by such as a password.

When a person is authenticated as a person previously registered, it is determined that a specified driver is to ride on a vehicle or has an intention to ride on a vehicle, so that it is predicted that an engine will be started.

Figure 2:
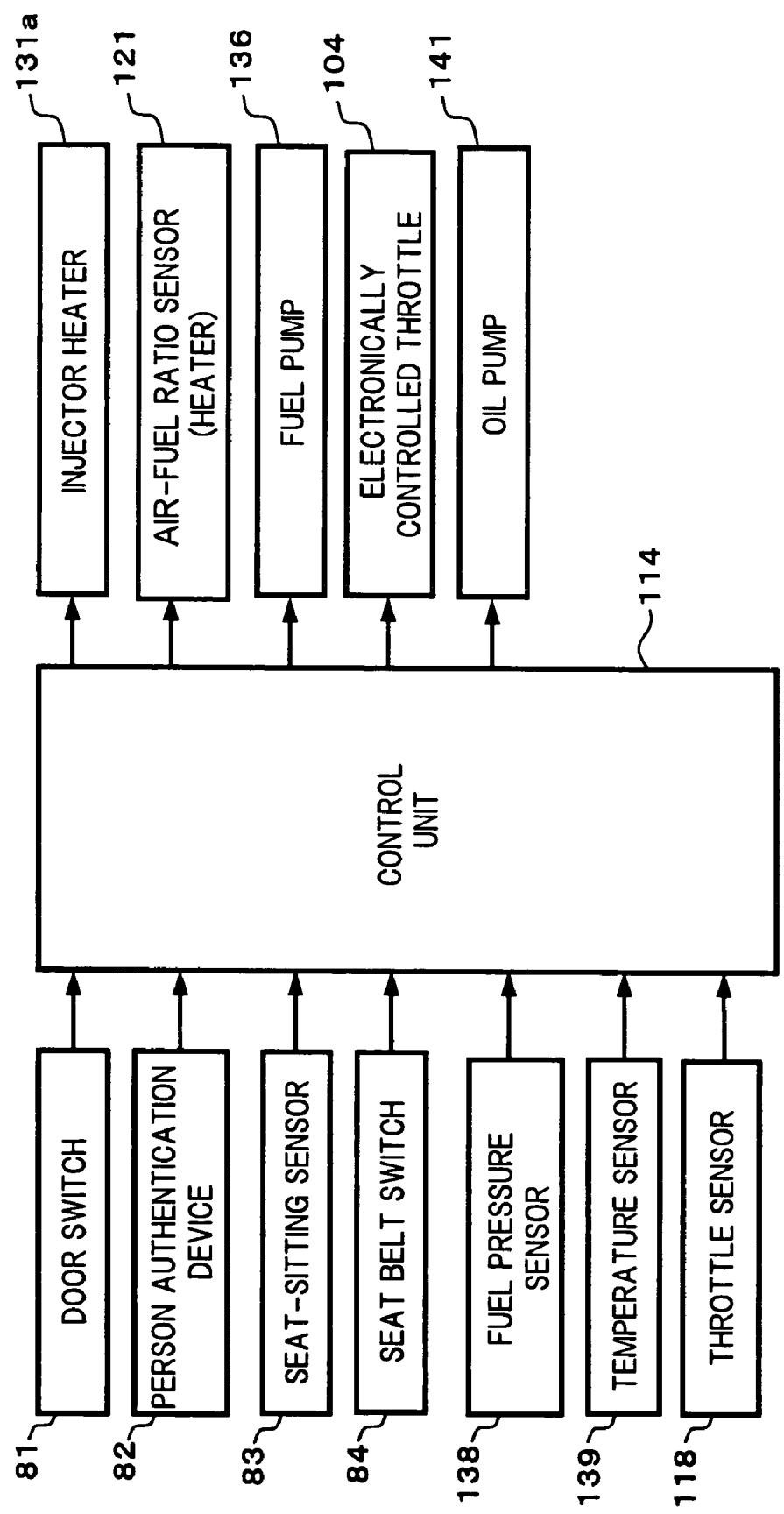
FIG. 2 is a block diagram schematically illustrating a circuit arrangement of a control unit that controls the engine.

Control unit 114 has a detection signal inputted thereto from a door switch 81, a person authentication device 82, a seat-sitting sensor 83, or a seat belt switch 84, as shown in FIG. 2, so as to determine that a driver is to ride on a vehicle or has an intention to ride on a vehicle as described above.

When starting of the engine is predicted prior to the engine start, in step S11, as described above, the routine proceeds to step S12 where a failure diagnosis of a previously selected device is performed.

Specifically, devices to be diagnosed include heater 131a, the heater of heater fitted air-fuel ratio sensor 121, fuel pump 136, and an oil pump 141, which devices are operated before starting the engine and for starting the engine.

Further, not only the above-mentioned devices for starting the engine but also various kinds of devices (e.g., electronically controlled throttle 104, and various solenoid valves) in association with the engine, an automatic transmission, and accessories may be included in the devices to be diagnosed.

The above-mentioned devices to be diagnosed are subjected to a diagnosis to examine whether or not there is disconnection or short-circuiting in respective drive circuits, or a function diagnosis, which diagnoses: whether or not an increase in temperature due to supplying of electric current to the heater occurs; whether or not an increase in pressure due to driving the pump (the fuel pump or oil pump) occurs; or whether or not an actual behavior to be taken in response to a motion command of opening/closing electronically controlled throttle 104 occurs.

For example, in the function diagnosis of fuel pump 136, driving of fuel pump 136 is initially started and then, an actual fuel pressure detected by fuel pressure sensor 138 after the elapse of a specified time is compared with a threshold value, or a rate of change of an actual fuel pressure detected by fuel pressure sensor 138 after starting the driving of fuel pump 136 is compared with a threshold value, and as a result, a diagnosis is carried out to determine whether or not fuel is normally discharged from fuel pump 136.

Moreover, with respect to heater 131a, it should be understood that in addition to the diagnosis of disconnection and a short-circuiting in the heater driving circuit, a fuel temperature detected by a fuel temperature sensor 139 after the elapse of a specified time from the starting of supply of electric current to the heater 131a is compared with a threshold value, or a rate of change of a fuel temperature detected by fuel temperature sensor 138 after the starting of supply of electric current to heater 131a is compared with a threshold value, and as a result, a diagnosis is carried out to determine whether or not the heat generated by heater 131a is normal.

Furthermore, as for electronically controlled throttle 104, the degree of opening of a throttle valve can be freely changed before starting the engine. Hence, for example, a control signal to open the throttle valve from a fully-closed position to a target degree of opening is supplied to throttle 104 and whether or not the throttle valve can be driven to the degree of opening responsive to the control signal is diagnosed on the basis of whether or not the actual degree of opening detected by throttle sensor 118 at that time is brought to the target degree of opening.

In step S13, only devices which have already diagnosed as being normal in step S12 among the devices for starting the engine such as heater 131a, the heater of air-fuel ratio sensor 121, fuel pump 136, and electrically operated oil pump 141, are brought into operation before the engine is started.

If the devices for starting the engine are operated before the engine is actually started (i.e., before a key switch is turned on), the engine per se can be started after bringing the devices in advance to a state optimum for starting the engine, so that starting performance and drivability just after starting the engine can be improved.

Specifically, for example, if electric current is supplied to heater 131a in advance so as to increase the temperature of heater 131a, fine atomization of the fuel can be facilitated from the beginning of the starting of the engine.

Moreover, when electric current is supplied in advance to the heater of air-fuel ratio sensor 121, the temperature of the element of air-fuel ratio sensor 121 can be increased close to an activation temperature before starting the engine. Hence, a commencement of the feedback control of an air-fuel ratio can be expedited.

Further, when fuel pump 136 and electrically operated oil pump 141 are operated in advance, the pressure of fuel and oil can be increased before the actual starting of the engine. Hence, the fuel can be well atomized and the oil can be well circulated from the beginning of starting of the engine.

Still further, among the devices for starting the engine, only the devices diagnosed as being normal are operated before staring the engine and the devices diagnosed as being failed are not operated. Hence, it is possible to avoid electric power from being wastefully consumed by supplying the failed devices with electric current for operation and to prevent occurrence of an excessive increase in temperature due to the supply of undesired electric current, and hence to eventually prevent the exhaust of the vehicular battery and the damage to the various devices.

In step S14, it is determined whether or not the ignition key is turned on.

When the ignition key is turned on, the routine proceeds to step S15 where it is determined whether or not any device is diagnosed as being failed by the diagnosis in step S12.

When all of the various kinds of diagnosed devices are diagnosed as being normal, the routine proceeds to step S16 where the respective devices are usually controlled. However, when some of the devices are diagnosed as being failed, the routine proceeds to step S17.

In step S17, a fail-safe process is performed, which is set in advance according to the device having been diagnosed as being failed and to the state of failure of that device.

The fail-safe process includes not only the processing of prohibiting the operation of the device, but also the processing of imposing a limitation on the operating range of the device or on the driving current of the device.

Moreover, the fail-safe process includes the processing of prohibiting the starting of the engine when a device failure incapable of operating the engine occurs.

As described above, by identifying a device not to be usually operated from the result of a diagnosis made in advance before starting the engine, the fail-safe process can be performed from the start of starting the engine. Hence, a reduction in the driving performance of the engine can be prevented as compared with a case where a diagnosis is made after starting the engine.

In this regard, by storing the histories of devices having been diagnosed as being failed after starting of the engine, among the devices for starting the engine, the operation of devices whose histories of failure diagnoses are stored can be prohibited from the beginning, before starting the engine.

Moreover, it is preferable that a warning of the result of failure diagnosis is given to the driver.

Figure 4:
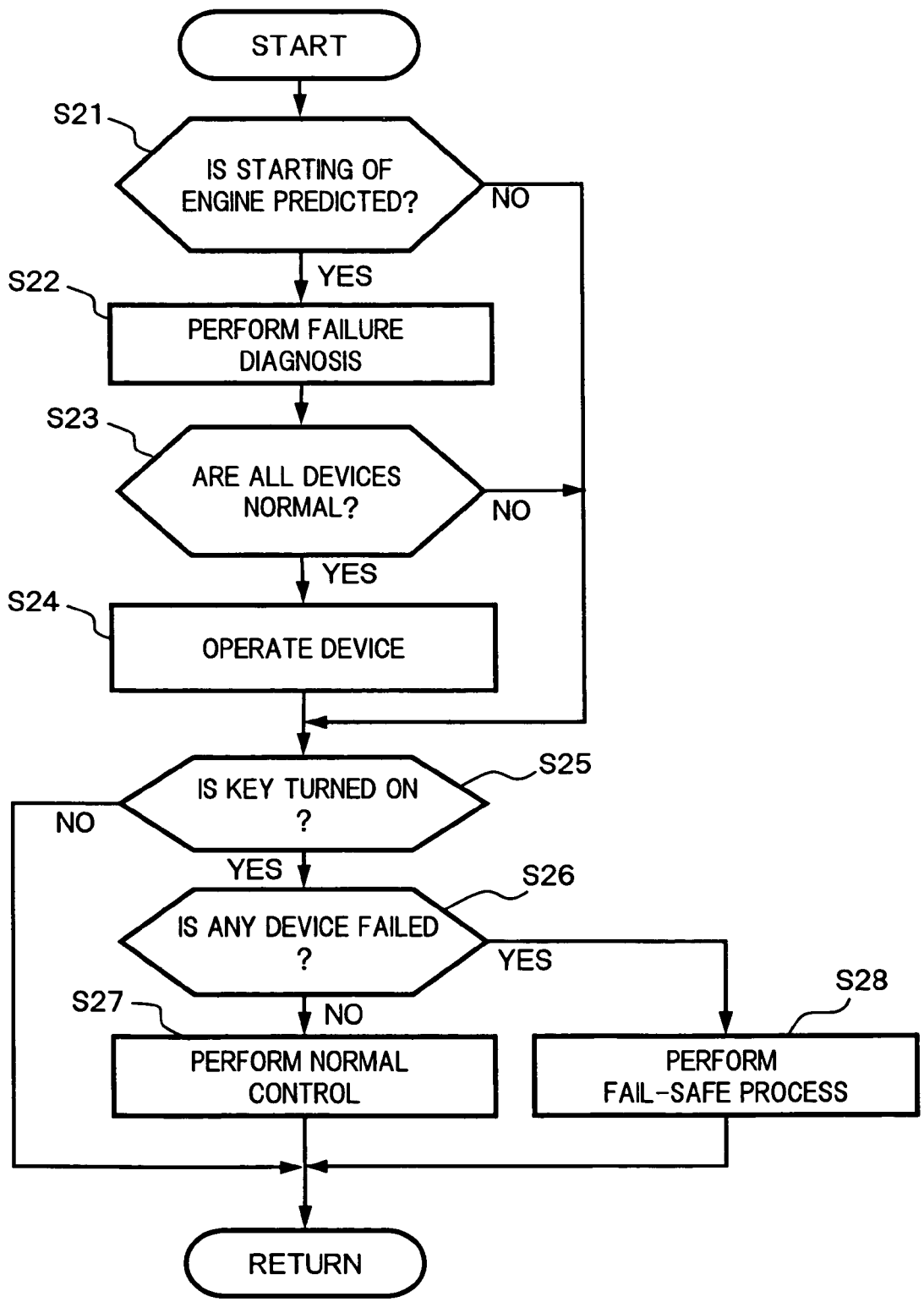
FIG. 4 is a flow chart illustrating starting control operation according to a second embodiment of the present invention.

The flow chart in FIG. 4 shows a second embodiment of a starting preparation control.

In step S21, just like the above-mentioned step S11, the starting of the engine is predicted.

Then, when the starting of the engine is predicted, the routine proceeds to step S22 where various kinds of devices are diagnosed as in the above-mentioned step S12.

In the next step S23, it is determined from the result of diagnosis in step S22 whether or not all of previously set devices for starting the engine are diagnosed as being normal.

Here, only when all of devices for starting the engine are diagnosed as being normal, the routine proceeds to step S24 where all of the plurality of devices for starting the engine are operated before starting the engine.

By contrast, if any one of the plurality of devices for starting the engine is diagnosed as being failed, the routine bypasses step S24 and proceeds to step S25, whereby none of the plurality of devices for starting the engine is operated before starting the engine.

Therefore, it is possible to avoid electric power from being wastefully consumed and to avoid an excessive temperature increase from being developed, and hence to prevent the exhaust of the vehicular battery and the damage to various kinds of devices by supplying an operating electric current to the failed device before staring the engine.

Furthermore, only when all of devices for starting the engine are normal, the devices for starting the engine are operated. Hence, when usual starting performance cannot be produced because of failures caused in some devices even if other normal devices are operated, it is possible to avoid the devices from being wastefully operated.

It should be appreciated that the entire contents of Japanese Patent Application No. 2005-278557, filed Sep. 26, 2005 are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

We claim:

1. An apparatus for controlling a vehicle having an engine and at least an electrical device operated to prepare a start of the engine, comprising:
 a starting-predicting means for predicting the start of the engine in advance of the start of the engine;
 a diagnosing means for determining a failure of the electrical device when the start of the engine is predicted in advance; and
 a starting-preparing means for operating the electrical device, when the diagnosing means has determined the electrical device to be normal in advance of the start of the engine, to prepare the start of the engine.

2. An apparatus for controlling a vehicle having an engine and at least an electrical device operated to prepare a start of the engine, comprising:
 a starting-predicting section configured to predict the start of the engine in advance of the start of the engine;
 a diagnosing section configured to determine a failure of the electrical device when the start of the engine is predicted in advance; and
 a starting-preparing section configured to operate the electrical device, when the diagnosing section has determined the electrical device to be normal in advance of the start of the engine, to prepare the start of the engine.

3. An apparatus for controlling a vehicle according to claim 2, wherein the electrical device comprises an electric heater.

4. An apparatus for controlling a vehicle according to claim 2, wherein the electrical device comprises an electric pump.

5. An apparatus for controlling a vehicle according to claim 2, wherein a plurality of the electrical devices are provided, and
 wherein when the diagnosing section determines that all of the plurality of the electrical devices are normal, the starting-preparing section is configured to operate the plurality of the electrical devices before the start of the engine to prepare the start of the engine.

6. An apparatus for controlling a vehicle according to claim 2, wherein when an occupant in the vehicle is detected, the starting-predicting section is configured to predict the start of the engine.

7. An apparatus for controlling a vehicle according to claim 2, further comprising an authenticating section configured to perform person authentication,
 wherein when a specified person is authenticated by the authenticating section, the starting-predicting section is configured to predict the start of the engine.

8. An apparatus for controlling a vehicle according to claim 2, further comprising a section configured to detect a moving body around the vehicle,
 wherein when a moving body is detected around the vehicle, the starting-predicting section is configured to predict the start of the engine.

9. A method of controlling a vehicle having an engine and at least an electrical device operated to prepare a start of the engine, comprising the steps of:
 predicting starting of the engine in advance of the start of the engine;
 determining a failure of the electrical device when the start of the engine is predicted in advance; and
 operating the electrical device, when the electrical device has been determined to be normal in the determining step in advance of the start of the engine, to prepare the start of the engine.

10. A method of controlling a vehicle according to claim 9, wherein the electrical device comprises an electric heater.

11. A method of controlling a vehicle according to claim 9, wherein the electrical device comprises an electric pump.

12. The method of controlling a vehicle according to claim 9,
 wherein a plurality of the electrical devices are provided, and
 wherein the step of determining determines a failure of each of the plurality of the electrical devices,
 wherein when all of the plurality of the electrical devices are determined to be normal, the step of operating the electrical devices operates the plurality of the electrical devices before the start of the engine to prepare the start of the engine.

13. The method of controlling a vehicle according to claim 9, wherein the step of predicting the start of the engine in advance, includes the steps of:

detecting an occupant in the vehicle; and predicting the start of the engine when an occupant in the vehicle is detected.

14. The method of controlling a vehicle according to claim 9, further comprising the step of:

performing person authentication, wherein when a specified person is authenticated by the person authentication, the step of predicting the start of the engine in advance predicts the start of the engine.

15. The method of controlling a vehicle according to claim 9, further comprising the step of:

detecting a moving body around the vehicle, wherein when a moving body is detected around the vehicle, the step of predicting the start of the engine in advance predicts the start of the engine.

\* \* \* \* \*